United States Patent [19]

Hinman, Jr. et al.

[11] 4,053,940
[45] Oct. 11, 1977

[54] MODIFIED OFFSET KEYING APPARATUS FOR PHASE COMPARISON RELAYING

[75] Inventors: Walter L. Hinman, Jr., New Providence; Russell W. Gonnam, Morris Plains, both of N.J.

[73] Assignee: Westinghouse Electric Corporation, Pittsburgh, Pa.

[21] Appl. No.: 716,045

[22] Filed: Aug. 20, 1976

[51] Int. Cl.² ................... H02H 7/26; H02H 3/28
[52] U.S. Cl. .................................. 361/68; 361/84
[58] Field of Search .............................. 361/67–69, 361/82–87, 76, 79

[56] References Cited

U.S. PATENT DOCUMENTS 3,986,079  10/1976  Hinman et al. ................ 361/68

Primary Examiner—J. D. Miller
Assistant Examiner—Patrick R. Salce

Attorney, Agent, or Firm—S. A. Seinberg

[57] ABSTRACT

Phase comparison relaying apparatus wherein the keying threshold levels at the local and remote ends of a protected power line section are each offset by a different value from the effective zero axis of the current waveform. One of the keying threshold values is set at a magnitude which will cause a trip response in the presence of low or medium magnitudes of outfeed current. The other keying threshold level is set at a magnitude which will cause a trip response in the presence of maximum magnitudes of expected outfeed current. The upper and lower current margin threshold levels are set to appropriately reflect the keying threshold level with which they are respectively associated. In addition, the transmmitter having the higher keying threshold level is located at that end of the protected line section where outfeed is expected.

8 Claims, 12 Drawing Figures

MODIFIED OFFSET KEYING APPARATUS FOR PHASE COMPARISON RELAYING

CROSS-REFERENCE TO RELATED APPLICATIONS

This application is an improvement over United States patent application Ser. No. 548,135 filed on Feb. 7, 1975 in the names of W. L. Hinman, Jr. and R. W. Gonnam and now U.S. Pat. No. 3986079. It is also an improvement over U.S. Pat. No. 3,832,601 issued on Aug. 8, 1974 in the names of W. L. Hinman, Jr. and R. W. Gonnam, U.S. Pat. No. 3,882,361 issued on May 6, 1975 in the name of W. L. Hinman, Jr., U.S. Pat. No. 3,893,008 issued on July 1, 1975 in the names of W. L. Hinman, Jr. and W. A. Strickland, and U.S. Pat. No. 3,898,531 issued on Aug. 8, 1975 in the name of W. L. Hinman, Jr. Also related in subject matter are U.S. patent application Ser. No. 548,130 filed on Feb. 7, 1975 in the name of K.K. Mustaphi, and now U.S. Pat. No. 3,963,964; Ser. No. 548,132 filed on Feb. 7, 1975 and now abandoned; continuation of serial no. 548,132, Ser. No. 665,650 filed on Mar. 8, 1976 and now U.S. Pat. No. 4,020,396; and U.S. patent application Ser. No. 716,048 filed on Aug. 20, 1976 in the names of W. L. Hinman, Jr. and R. W. Gonham. All of the foregoing are commonly assigned to the assignee hereof.

BACKGROUND OF THE INVENTION

This invention relates to protective relaying apparatus of the type which utilizes phase comparison techniques. More particularly, this invention relates to such relaying apparatus wherein the transmitter keying threshold levels have been offset from the effective zero axis of the current waveform in each phase of a protected line section.

Normally, when a protected power line transmission line section is faulted, fault current will flow inwardly to the fault from energized busses. Under this type of fault condition, the relaying apparatus will cause breaker tripping to take one or more phases of the protected line section down until the fault is cleared. However, under certain internal fault conditions, as in the case of a high resistance line-to-ground or line-to-line, this will not occur. For example, assuming a strong power supply bus at one end of the protected line section and a weak power supply bus supplying load at the other end, it is possible to have a net outfeed from the protected line section into the weak bus. In such an instance, the relaying apparatus would not recognize nor respond to the internal fault and breaker tripping would have to be accomplished by secondary or backup protection.

A solution to this problem was set forth in the above-referenced U.S. patent application Ser. No. 548,135. In that case, the keying threshold levels of each transmitter, one being located at each end of the protected line section, were each offset a like and opposite amount from the effective zone axis of the current waveform. It was found, however, that this solution was satisfactory only where the magnitude of outfeed current is relatively small, that is, no more than approximately 4 amperes of secondary current.

This is due to the requirement that the keying threshold level be set above the maximum expected outfeed current. In some instances, this cause the keying threshold level to be set relatively high. While this arrangement proved generally satisfactory, it was found that the relaying apparatus would not respond or thereby trip an associated breaker in the case of an internal fault causing infeed current levels below that now recognizable by the relatively high keying threshold levels. In other words, offset keying with a relatively high threshold level led to a "blind spot" in the response of the relaying apparatus.

SUMMARY OF THE INVENTION

Accordingly, there is provided modified relaying apparatus cooperatively associated with both the local and remote end portions of a power line section protected thereby. The modified relaying apparatus includes circuit means for generating first and second keying threshold limits, both of which are offset by differing amounts from the effective zero axis of the waveform of current flowing at each end of the protected line section. The offset for one of the keying threshold levels is selected to accommodate maximum outfeed fault current at one of the end portions of the protected line section while the offset for the other keying threshold limit is selected to accommodate lower magnitudes of infeed current. Preferably, the circuit means which generates the higher absolute magnitude of the keying threshold limit is cooperatively associated with whichever end of the protected line section is expected to experience outfeed fault current.

Additional circuit means are provided for generating first and second sets, of constant upper and lower limits, of a current security margin associated respectively with the second and first keying threshold limits. Each of the first and second sets are also offset from the effective zero axis of the waveforms representing current flow at the local and remote ends of the protected line section with which the additional circuit means are cooperatively associated.

Further, the absolute magnitude of the higher keying threshold limit is set at the absolute magnitude of the maximum expected outfeed fault current plus a first safety margin. The magnitude of upper or lower limit of the set of current margins nearest the effective zero axis of its associated waveform is also set at the absolute magnitude of the maximum expected outfeed fault current plus a second safety margin, the first safety margin being absolutely greater than the second.

DESCRIPTION OF THE PREFERRED EMBODIMENT

Figure 1:
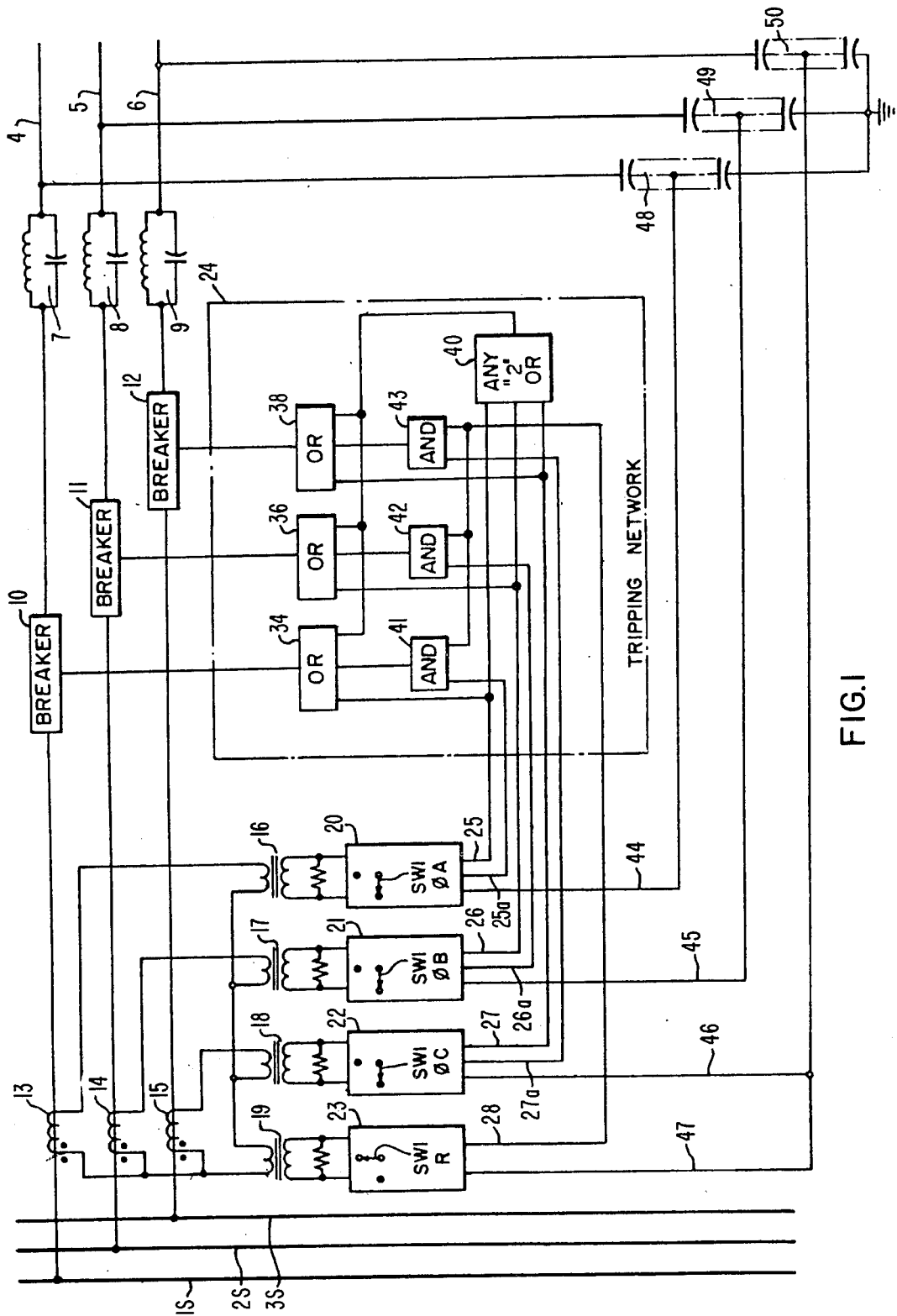
FIG. 1 is a block diagram illustrating relaying apparatus associated with one end terminal of a protected line section.

Referring now to the drawings wherein like reference characters are employed in the several views to identify like elements, FIG. 1 illustrates a block diagram of that portion of a segregated phase comparison relaying apparatus associated with one end of a protected power line section. It should be noted that while the present invention will be described hereinafter in connection with segregated phase comparison relaying apparatus, it may be used in conjunction with any comparison relaying apparatus such as, for example, segregated phase or mixed excitation.

Reference numerals 1S, 2S and 3S designate respectively the three busses at the illustrated end of the protected line section. These busses are supplied from a source (not shown) which for present purposes can be considered as strong. The busses 1S, 2S and 3S are connected to phase conductors 4, 5 and 6, respectively, through line traps 7, 8 and 9 and circuit breakers 10, 11 and 12. Current transformers 13, 14 and 15 are associated respectively with the phase conductors 4, 5 and 6 and are connected through the isolating current transformers 16, 17 and 18, respectively, to the phase relaying networks 20, 21 and 22. An isolating transformer 19 is connected to conduct the residual or ground current in the normal manner and it energizes the ground relaying network 23. The isolating transformers 16, 17, 18 and 19 energize loading resistors whereby voltage quantities having a magnitude that is proportional to the current in the conductors 4, 5 and 6 and the residual current respectively, are supplied to the networks 20, 21, 22 and 23.

The networks 20, 21, 22 and 23 are identical except that the residual network 23 has its switch SW1 in a position such that the fault current is detected by the $I_L$ overcurrent network 60 rather than by the fault detector 58.

The networks 20, 21, and 22 are each provided with output conductors 25, 26 and 27, respectively, which normally provide logical 0 signals to the OR gates 34, 36 and 38. These OR gates are connected to actuate the breakers 10, 11 and 12, respectively. In the event of the faulting of one or more of the conductors 4, 5 and 6, of corresponding network will be actuated to cause its output conductor 25, 26 or 27, as the case may be, to supply a logical 1 signal to and thereby, in turn, cause one or more of the OR gates 34, 36 or 38 to supply a logical 1 signal to trip the proper one or ones of the breakers 10, 11 or 12. The output conductors 25, 26 and 27 are also connected to input terminals of an ANY "2" OR gate 40, the output of which is connected to each of the OR gates 34, 36 and 38. Therefore, in the event of the faulting of two or more of the conductors 4, 5 and 6, all of the breakers 10, 11 and 12 will be actuated to disconnect the conductors from the busses 1S, 2S and 3S.

The networks 20, 21 and 22 are also provided with output conductors 25a, 26a and 27a, respectively, which are connected to a first input of the AND gates 41, 42 and 43, respectively. The second inputs to the AND gates 41, 42 and 43 are connected together from the output conductor 28 of the network 23. As will be described in greater detail below, the detection of a ground or residual current fault by the network 23 provides a logical 1 signal on the conductor 28 and to the second input of each of the AND gates 41, 42 and 43. In the event a ground current fault occurs, one of the networks 20, 21 and 33 will also energize its output conductor 25a, 26a or 27a with a logical 1 signal and one of the AND gates 41, 42 and 43 will supply a logical 1 signal to one of the OR gates 34, 36 and 38 whereby one of the breakers 10, 11 and 12 will be energized to disconnect the faulted one of the conductors 4, 5 and 6.

Figure 2:
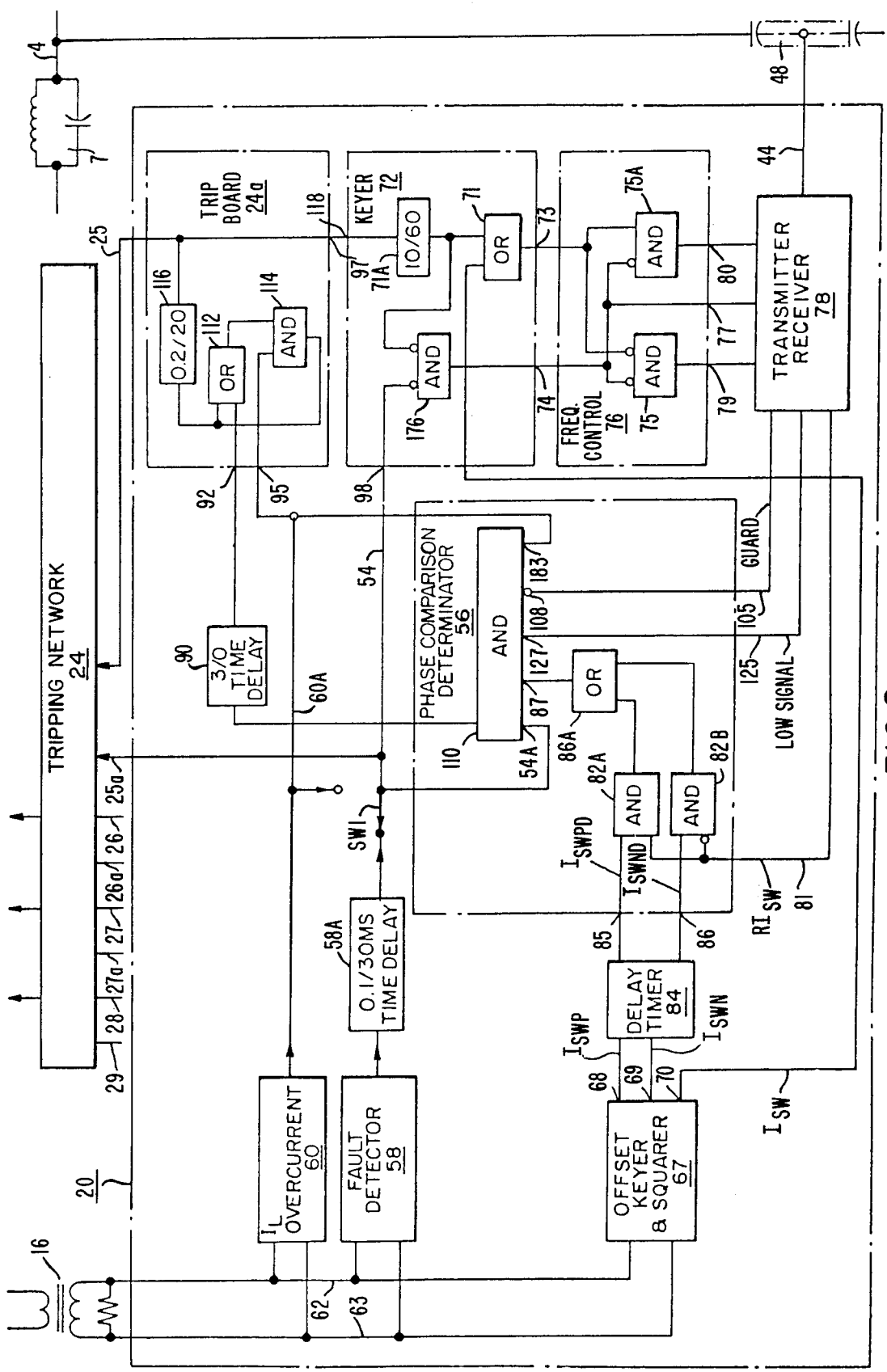
FIG. 2 is a detailed block diagram showing portions of the associated relaying apparatus of FIG. 1 in greater particularity.

The network 20 is more completely shown in FIG. 2 and includes a fault detector 58 which provides a logical 1 output signal when it detects a fault on the conductor 4. This fault detector may take any of various suitable forms, one of which may be the fault detector shown and described in U.S. Pat. No. 3,654,516, issued on Apr. 4, 1972 to M. Traversi. The output of the fault detector 58 is connected through a time delay 58A and then via conductor 54 to one input terminal 54A of an AND gate 110 (the switch SW1 being in its illustrated position) and provides a first enabling signal to the AND gate 110.

An $I_L$ overcurrent network 60, energized from the busses 62 and 63, is connected by a conductor 60A to a second input terminal 183 of the AND gate 110. The overcurrent network 60 may take any suitable desired form in which a logical 1 signal will be provided whenever the input signal from the busses 62 and 63 represents a line current greater than a predetermined minimum current which, for example, may be the maximum expected charging current of the conductor 4. The conductor 60A is also connected to the input terminal 95 of the trip board 24a and therefrom to one input terminal of its AND gate 114. The output terminal of the AND gate 114 is connected through a timer 116 to the output conductor 25. With this arrangement, the trip board 24a can never supply a tripping signal to the tripping network 24 unless and until the $I_L$ overcurrent network 60 supplies a logical 1 signal thereto.

The transmitter-receiver 78, when it is receiving a signal from the remotely located transmitter-receiver (not shown) at the other end of the protected line section, of at least the proper magnitude, provides a logical 1 section to its output conductor 125 which is applied to a third input terminal 127 of the AND gate 110. If the transmitter-receiver 78 fails to receive a signal of sufficient strength, the resulting logical O signal on the input terminal 127 will prevent a logical 1 signal at the output of the AND gate 110. When the transmitter-receiver 78 is receiving a guard signal from the remote transmitter-receiver, a logical 1 signal will be supplied to its output conductor 105 and thereby to the NOT input terminal 108 of the AND gate 110. The AND gate 110 will therefore be enabled to provide an output signal only in the absence of the reception of a guard signal by the transmitter-receiver 78.

Under normal, non-fault conditions, no $RI_{SW}$ signal, the square wave signal transmitted from the remote location in response to current waveform signal excursions through the remote keying threshold level, will be supplied by the transmitter-receiver 78 over its output conductor 81 to the normal and NOT input terminals of the AND gates 82A and 82B, respectively. The $RI_{SW}$ signal comprises a series of alternating logical 1 and 0 signals indicating the instantaneous magnitude of the current in line 4, with reference to the keying threshold level, at the remote location. The AND gates 82A and 82B serve as current comparison devices for comparing the relative magnitude of the current at the remote end of the line as supplied to the conductor 81, with the relative magnitude of the current square waves derived from the current supplied locally through the transformer 16 to the offset keyer and squarer network 67, more fully shown in FIG. 3. For the present, it is sufficient to state that a logical 1 signal will be supplied to the output conductor 68 of the offset keyer and squarer 67 during selected portions of the positive half-cycle of the signal between the busses 62 and 63 and a logical O signal will be supplied at its output conductor 69 during at least a portion of the positive half-cycle of the quantity between the conductors 62 and 63. These output signals are delayed in the usual manner by the delay timer 84 and are provided to the input terminals 85 and 86 of the phase comparison determinator 56 and therefrom to the normal input terminals of the AND gates 82A and 82B respectively.

When logical 1 signals are supplied concurrently to both of the input terminals of the AND gate 82A, the OR gate 86A will provide a logical 1 signal to the input terminal 87 of the AND gate 110. Similarly, when a logical 1 signal is supplied to the terminal 86 and a logical 0 signal is supplied concurrently by the conductor 81 to the AND gate 82B, a logical 1 output signal will also be supplied to the OR gate 86A, which also provides a logical 1 signal to the input terminal 87. However, in the absence of an enabling logical 1 signal at the input terminal 54A, and/or the presence of a logical 1 guard signal at the NOT input terminal 108, the AND gate 110 remains ineffective to provide any logical 1 output signals to the delay timer 90 to initiate its timing.

The offset keyer and squarer 67 provides an $I_{SW}$ signal on its output conductor 70 and therefrom to one input terminal of an OR gate 71 of the keyer 72. This $I_{SW}$ signal comprises a series of logical 1 and logical 0 signals as determined by the magnitude of the current signal supplied by the transformer 16 as compared to the keying threshold level at the local location. When $I_{SW}$ is logical 1, OR gate 71 is enabled, setting output terminal 73 of the keyer 72 to a logical 1. This sets the normal input of AND gate 75A to a logical 1 and one of the NOT input terminals of AND gate 75 to a logical 0. Conversely, when $I_{SW}$ is a logical 0 and assuming that the timer 71A has not been actuated and timed out, the normal input to AND gate 75A is set to a logical 0 and the previously mentioned NOT input terminal of AND gate 75 is set to a logical 1.

In the absence of a fault, a logical 0 signal will be supplied over the conductor 54 to the input terminal 98 of the keyer 72 and therefrom to one NOT input terminal of the AND gate 176. The other NOT input terminal of the AND gate 176 is connected to the output of the 10/60 timer 71A which normally provides a logical 0 output signal. The AND gate 176, during non-fault operation, therefore provides a logical 1 signal through the output conductor 74 to NOT input terminals of the AND gates 75 and 75A of the frequency control 76. This logical 1 signal disables both of the AND gates 75 and 75A so that during non-fault operation, logical 0 output signals are supplied by the conductors 79 and 80 to the transmitter-receiver 78. The logical 1 signal, normally supplied by the AND gate 176, is conducted by output conductor 77 of the frequency control 76 to the transmitter-receiver 78 and functions as the guard signal.

The transmitter-receiver 78 may take any form in which it will transmit a guard signal in response to a logical 1 input signal on the conductor 77. It will also supply trip-positive and trip-negative signals in response to the alternating logical 1 and logical 0 signals on the conductors 79 and 80, which event occurs when a logical 0 signal is supplied to the output conductor 77 from the AND gate 176.

When a fault occurs on the conductor 4, a logical 1 signal will be supplied by the fault detector 58 to the input terminal 54A of the AND gate 110 and to the input terminal 98 of the keyer 72. When this occurs, the AND gate 176 provides a logical 0 signal to the conductor 77 and to the NOT input terminals of the AND gates 75 and 75A. At this same time, the $I_{SW}$ signal will be supplied to the OR gate 71, and the output conductor 73 of the keyer 72 will then responsively provide a series of logical 1 and logical 0 signals to the second NOT input terminals of the AND gate 75 and to the normal input terminal of the AND gate 75A, whereby the output conductors 79 and 80 will be sequentially energized by logical 1 and logical 0 signals. This, coupled with the logical 0 signal on conductor 77, causes the transmitter 78 to transmit as its $RI_{SW}$, the trip-positive and the trip-negative signals to the transmitter-receiver at the remote end of the protected line section.

Assuming that portions of the relaying apparatus associated with the remote location has detected the fault, and has interrupted its transmission of the guard signal and is transmitting its $RI_{SW}$ signal, the transmitter-receiver 78 will supply a logical 0 signal to the NOT input terminal 108 of the AND gate 110. Further assuming that the received signal is of sufficient strength, a logical 1 signal will be supplied to the input terminal 127 of the AND gate 110 and alternating logical 1 and logical 0 signals representing the quantity $RI_{SW}$ will be supplied to the AND gates 82A and 82B. If the fault is internal to the protected line section, the logical 1 signal of the $RI_{SW}$ quantity will occur concurrently with the logical 1 signal of the $I_{SWPD}$ quantity and the logical 0 signal of the $RI_{SW}$ quantity wil occur concurrently with the logical 1 signal of the $I_{SWND}$ quantity. The logical 1 output signals from the AND gates 82A are supplied to the OR gate 86A and thereby to the input terminal 87 of the AND gate 110. The AND gate 110 being satisfied, supplies a logical 1 input signal to the time delay 90 which immediately commences to time out.

If the logical 1 signal thereto exists for at least the 3 m.s. timing period, a logical 1 signal will be supplied by the time delay 90 through the input terminal 92 of the trip board 24a to one input terminal of the OR gate 112. The resulting logical 1 output of the OR gate 112 is supplied to the second input terminal of the AND gate 114 which, because of the logical 1 signal being supplied by the network 60, will supply a logical 1 input signal to the other input terminal of the OR gate 112 to maintain the AND gate 114 effective to continue logical 1 output to the input of the 0.2/20 m.s. timer 116. When the timer 116 times out, it supplies a logical 1 signal to the output conductor 25 and, via conductor 97, to the input terminal 118 of keyer 72. As discussed above and as will be apparent from FIG. 1, this logical 1 output signal is supplied to the OR gate 34 which thereupon supplies a logical 1 or tripping signal to the breaker 10 causing the breaker 10 to open and disconnect the conductor 4 from the bus 1S.

If the fault which occured is a phase to ground fault, the network 23, which has its switch SW1 connected to utilize its $I_L$ overcurrent network 60 as a fault detector, would likewise "see" the fault and would apply a logical 1 output signal via its conductor 28 (which is equivalent to the conductor 25 of the network 20) to each of the AND gates 41, 42 and 43. With a phase A to ground fault, only the conductors 25a and 28 will have a logical 1 output signal and only AND gate 41 will provide a logical 1 signal to the OR gate 34 which serves as a backup arrangement for tripping the breaker 10. Similar breaker response would issue for the other possible phase-to-ground faults.

Assuming a phase A to phase B fault, the network 21 and the network 20 would "see" the fault and place logical 1 output signals on output conductors 25, 25a, 26 and 26a. The logical 1 output signal on conductor 26 supplies a logical 1 input signal to the OR gate 36 which thereupon supplies a logical 1 signal to trip the breaker 11 and the logical 1 signal on conductor 25 trips the breaker 10 as described. The breakers 10 and 11 are thereby actuated to disconnect the phase conductors 4 and 5 from the busses IS and 2S, respectively.

The conductors 25 and 26 are also connected to the ANY "2" OR gate 40 which is effective when two logical 1 input signals are supplied thereto to supply a logical 1 output signal to each of the OR gates 34, 36 and 38 whereby the breaker 12 is tripped, as well as the breakers 10 and 11. This actuation of the breaker 12, even though the line 6 is not faulted, is usally desirable to maintain system stability. Similar breaker response would ensue for the other possible phase-to-phase faults.

When timer 116 has timed, out, a logical 1 signal, as previously mentioned, is forwarded to the tripping network 24. In addition, as previously noted, a logical 1 signal is forwarded to timer 71A of the keyer 72. When timer 71A times out, it forwards a logical 1 signal to one NOT input of AND gate 176 and to one input of OR gate 71. As a result, the output terminals 73 and 74 of keyer 72 are set to a logical 1 and a logical 0, respectively. This enables AND gate 75A and disables AND gate 75. Thus, when the relaying apparatus at the illustrated end portion of the protected line section trips its associated breaker, inputs 77 and 79 to the transmitter-receiver 78 are held at a logical 0 while input 80 is held at a steady logical 1. In other words, in response to a tripping signal, the transmitter-receiver 78 transmits a steady trip-positive or steady positive $RI_{SW}$ signal.

Thus far discussed, the operation is substantially identical to that described in the said above-identified U.S. Pat. NO. 3,893,008. In the apparatus of said patent, if the pulse currents at the two ends of the protected line section did not both flow into the line section or if the flow was outwardly of the protected line section even for the 3 m.s. time delay of the timer 90, no logical 1 output tripping signal would be supplied to the input terminal 92 of the trip board 24a and no tripping of the breakers would occur because the phase comparison determinator 56 would not recognize the fault as internal to the protected line section, but would believe it to be external thereto.

Figure 4:
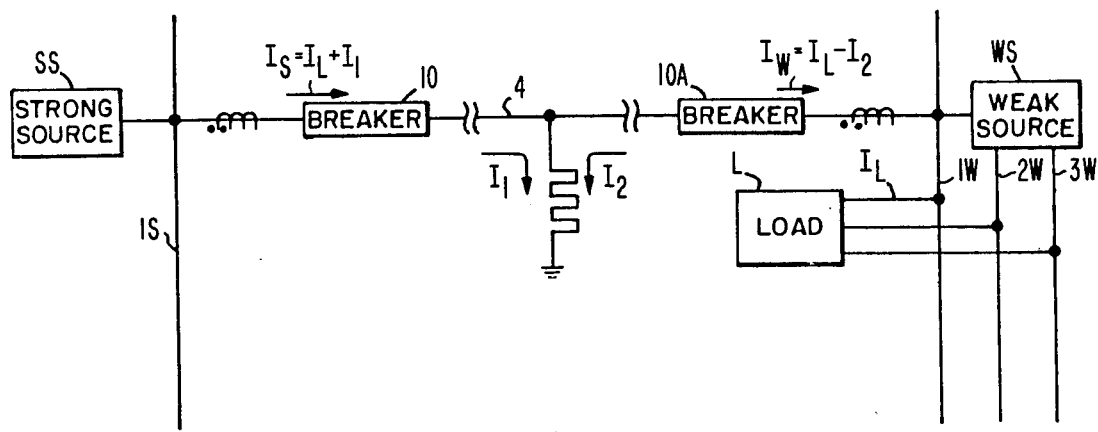
FIG. 4 schematically illustrates the protected line section connected between a strong and a weak source subjected to an internal, high resistance ground fault resulting in outfeed current.

As is illustrated, particularly in FIG. 4, if the fault is a relatively high resistance single line to ground fault, and the bus $I_S$ is supplied from a strong source of power and the bus $I_W$ is supplied from a weak source of power and a load of $I_L$ amperes is supplied from the bus 1W, current $I_S$ flows from the bus 1S through the breaker 10 of a magnitude equal to $I_L + I_1$, where $I_1$ is the portion of the fault current which is supplied by the bus 1S. The current flowing through the breaker 10A will be equal to $I_W$, which is equal to $I_L - I_2$, where $I_2$ is the portion of the fault current supplied by the bus 1W. Under the assumed conditions, the magnitude of the current quantity $I_L$ is greater than the magnitude of the current quantity $I_2$, so that the current $I_W$ flows through the breaker 10A to the bus 1W.

Figure 5:
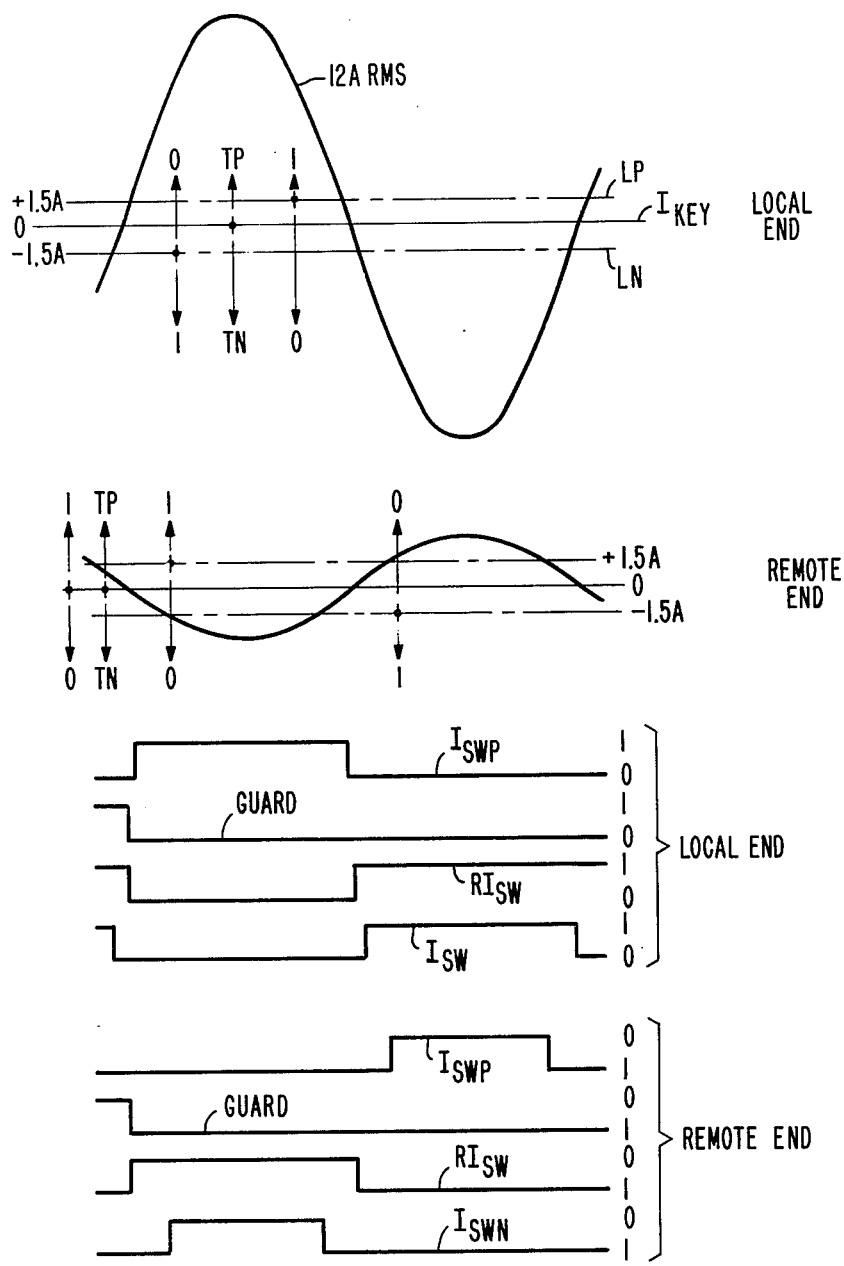
FIG. 5 depicts the fault current waveforms of the FIG. 4 arrangement at the local and remote ends of the protected line section and the corresponding logic signals generated by associated prior art relaying apparatus.

Under the prior art condition in which the transmitter is keyed at substantially the 0° and 180° points of the current wave and the $I_{SWP}$ and $I_{SWN}$ pulses are initiated at 1.5 amps positive and 1.5 amps negative, respectively, the values of $RI_{SW}$, $I_{SWP}$ and $I_{SWN}$ will be as illustrated in FIG. 5. Since neither of the AND gates 82A or 82B will provide logical 1 output signals, no logical 1 input signal will be supplied to the input terminal 87 of the AND gate 110. In this regard, it should be noted that for AND gate 82A to provide a logical 1 output signal, logical 1 signals must concurrently be applied by $I_{SWP}$ and $RI_{SW}$. In order to have a logical 1 output signal from AND gate 82B, a logical 0 and logical 1 signal must be applied thereto by the $RI_{SW}$ and the $I_{SWN}$ quantities. It will be apparent from FIG. 5 that this does not occur.

Figure 6:
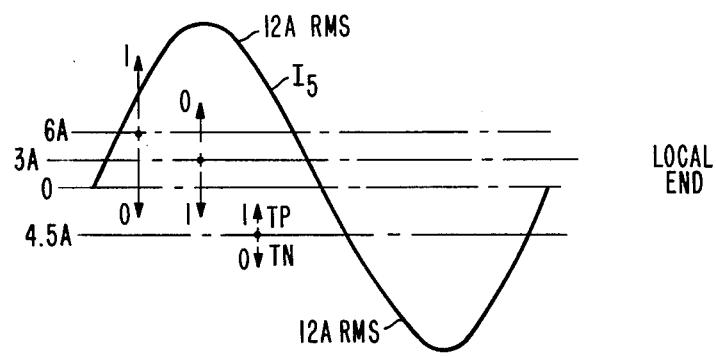
FIG. 6 illustrates the fault current waveforms of the FIG. 4 arrangement at the local and remote ends of the protected line section and the corresponding logic signals generated by another associated prior art relaying apparatus.
Figure 6:
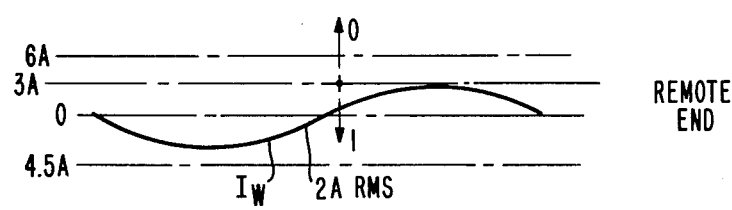
Figure 6:
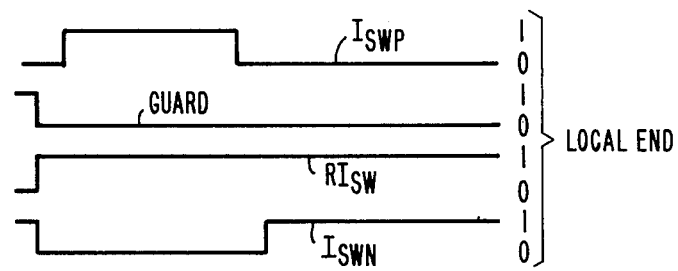
Figure 6:
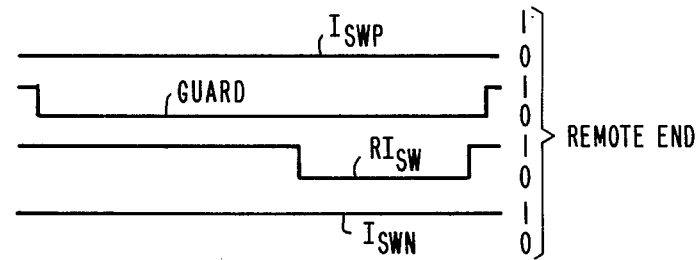

In accordance with the invention described in the above-identified United States Patent, this problem was overcome by setting the keying signal, $I_{SWP}$ and $I_{SWN}$ non-symmetrical. That is, as illustrated in FIG. 6, the keying signal is set to occur at −4.5 amperes, while the $I_{SWP}$ and $I_{SWN}$ thresholds are set at +6.0 amperes and +3.0 amperes, respectively. The current values as used herein are the output values of the transformers 16–18 on the basis that 5 amperes represents the full load current of the transmission line. Under the conditions as shown in FIG. 6, with a fault occurring at the 0° point in the current wave $I_4$, the AND gate 82A will shortly provide a logical 1 output signal, because logical 1 signals are being supplied by both the $RI_{SW}$ and the $I_{SWP}$ quantities. Assuming a 60 Hz current, it will be apparent that the logical 1 output signal from the AND gate 82A will remain for substantially more than 3 m.s. and a tripping signal will be provided by the time delay 90 to the trip board 24a, which will thereupon trip the breaker 10 as described above.

As illustrated in FIG. 6 and as described above, the fault is assumed to have occurred at the 0° point of the current wave $I_4$. However, if the fault occurred at the 180° point, the proper phase comparison would not occur until after the next succeeding 0° point and a lapse of some 8 m.s. would occur before the time delay 90 would start to time out. While this is true for the network 20, it should be noted that since the magnitude and phase of the current signal supplied to the network 23 are equal and opposite to that supplied to the network 20, tripping under these conditions would be in response to the logical 1 output signal on the conductor 28. Similarly, if the fault was a high resistance phase A to phase B fault, the fault current in one of the faulted conductors would be 180° out of phase with the fault current in the other of the conductors, and tripping would likewise occur as described above.

The selections of the current threshold levels at which the logical signals of the quantities $I_{SWP}$, $I_{SWN}$ and $RI_{SW}$ change from 0 to 1 and vice versa may best be understood by referring to FIGS. 4 and 6. It has been assumed therein that the maximum "outfeed" current $I_W$ under fault conditions will be 2 amperes RMS. In order to obtain a breaker tripping signal (see truth table), one of two sets of conditions as set forth in the truth table must exist for at least the timing out interval (3 m.s.) of the timer 90. At the local end, the current $I_S$ during the positive half-cycle is of ample magnitude to cause the quantity $I_{SWP}$ to be a logical 1 signal. Under "outfeed" fault conditions, the $RI_{SW}$ quantity must also be a logical 1 signal. The $RI_{SW}$ quantity is a logical 1 signal whenever the magnitude of the current $I_W$ is more positive than a predetermined design magnitude at which the $RI_{SW}$ changes to a logical 0 signal. With the assumed RMS magnitude of 2 amperes, the maximum magnitude will be approximately 2.8 amperes. The design magnitude for $RI_{SW}$ should therefore be negative and greater than 2.8 amperes. This will, as illustrated, concurrently provide logical 1 signals for the quantities $I_{SWP}$ and $RI_{SW}$ for at least the 3 m.s. interval and the associated breaker will trip.

At the remote end, the current $I_W$ "outfeed" is small for the assumed conditions and the tripping is accomplished by the $I_{SWN}$ and $RI_{SW}$ quantities. For security reasons, the time delay of the timer 90 has been selected to be 3 m.s. The quantity $I_{SWN}$ should maintain a logical 1 signal and the quantity $RI_{SW}$ maintain a logical 0 signal for at least 3 m.s. and preferably somewhat longer as, for example, 3.3 m.s. The $RI_{SW}$ quantity is a logical 0 signal when the magnitude of the current $I_W$ is above its design magnitude and this will be throughout the fault period.

The current $I_W$ will be positive and of a maximum magnitude of approximately 2.8 amperes and since the quantity $I_{SWN}$ is a logical 1 signal only when the magnitude of $I_S$ is less than a predetermined selected value, this selected value is chosen as 3 amperes. This assures that the quantity $RI_{SW}$ will be a logical 0 and, concurrently, that the quantity $I_{SWN}$ will be a logical 1 for a sufficient time interval to time out the time delay 90 and trip the breaker at the weak end.

Figure 7:
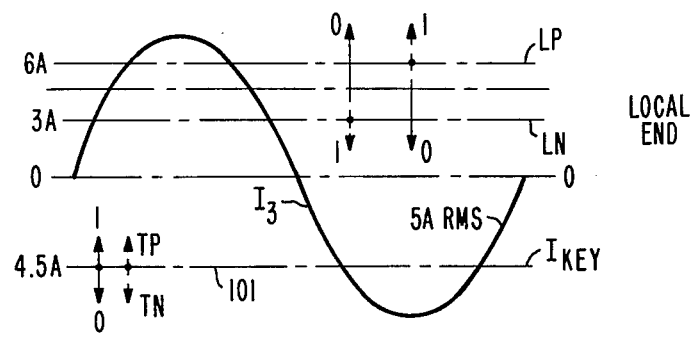
FIG. 7 illustrates the fault current waveforms at the local and remote ends of the protected line section for an external fault and the corresponding logic signals generated by the associated prior art relaying apparatus utilized in FIG. 6.
Figure 7:
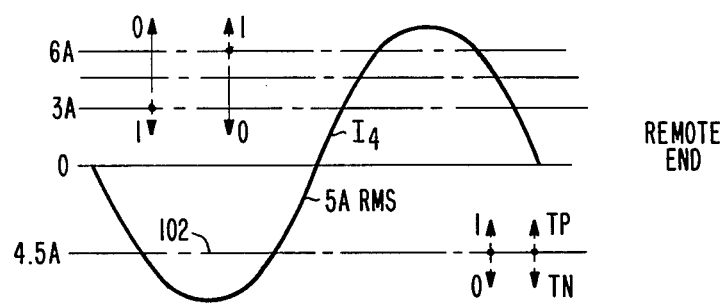
Figure 7:
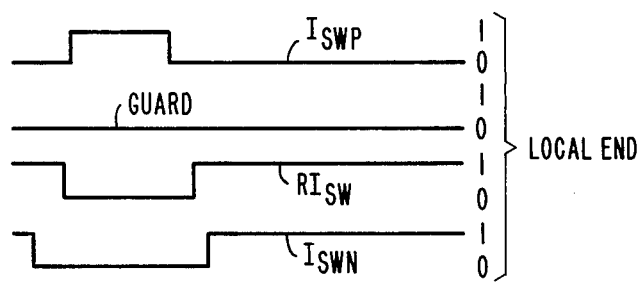
Figure 7:
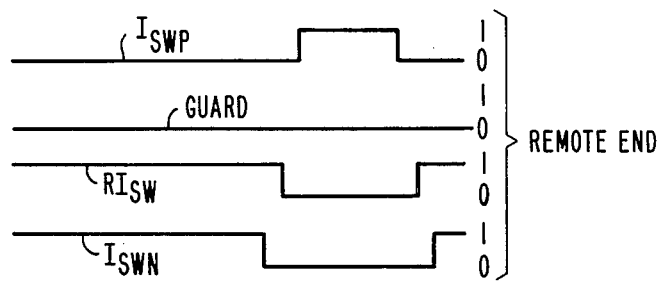

The selection of the magnitude at which the quantity $I_{SWP}$ changes from a logical 0 to a logical 1 signal may best be understood by referring to FIG. 7. It must be such that neither of the AND gates 82A and 82B will supply logical 1 output signals of sufficient duration to time out the delay 90. The phase and magnitude of the current $I_3$ and $I_4$ at the local and remote ends of the conductor during an external fault may not be exactly as illustrated in FIG. 7 and therefore it becomes desirable at the local end to have the quantity $RI_{SW}$ establish its logical 0 signal well ahead of the quantity $I_{SWN}$ establishing its logical 1 signal and vice versa.

During an external fault, the current at the two ends of the line are, with limited exception, equal as illustrated in FIG. 7. Therefore, the magnitude of the current $I_3$ at the local end, when the local $RI_{SW}$ quantity changes from a logical 1 to a logical 0 signal, will be as illustrated by the horizontal dotted line 101 through the current wave $I_3$. Similarly, the magnitude of the current $I_4$ at the remote end, when the remote $RI_{SW}$ quantity changes from a logical 0 to a logical 1 signal, will be as illustrated by the horizontal dotted line 102 through the remote current wave $I_4$.

During the positive half-cycle of the current $I_3$, it is desirable to delay the changing of the $I_{SWP}$ quantity to a logical 1 signal for a suitable time interval. This time interval (which is not of a fixed magnitude) is obtained by choosing the difference in magnitude of the current $I_3$ between that at the time the $RI_{SW}$ quantity became a logical 0 signal and that at the time the $I_{SWP}$ quantity became a logical 1 signal. Similarly, during the positive half-cycle of the current $I_4$, the time (not fixed) interval between the time the remote $RI_{SW}$ quantity became a logical 1 signal and the time the remote $I_{SWN}$ quantity became a logical 1 signal is established by the difference in magnitude of the current $I_4$. A suitable current change is 1.5 amperes and is referred to a current margin of safety.

In the case of the external fault, it is desirable that the local $I_{SWN}$ quantity changes from its logical 1 to its logical 0 signal prior to the change of the local $RI_{SW}$ quantity from its logical 1 to its logical signal to prevent AND gate 82B from providing a logical 1 signal at its output. Similarly, at the remote end, the quantity $I_{SWN}$ should have a logical 0 signal prior to the quantity remote $RI_{SW}$ providing its logical 0 signal. A suitable current difference is 1.5 amperes.

It will now be apparent that under the described conditions, the current magnitude, absolute, at which the $I_{SWN}$ quantity changes from a logic 1 to a logic 0 signal should be 1.5 amperes (absolute) less than the current magnitude (absolute) at which the $RI_{SW}$ quantity changes from its logical 1 to its logical 0 signal. Similarly, the current magnitude (absolute) at which the $I_{SWP}$ quantity changes from a logic 0 to a logic 1 signal should be 1.5 amperes (absolute) greater than the current magnitude (absolute) at which the $RI_{SW}$ quantity changes from its logical 1 to its logical 0 signal.

Since, as was pointed out in connection with the fault conditions illustrated in FIG. 6, the magnitude of the current at which $I_{SWN}$ changes its logic signal is 3 amperes, the current magnitude at which the $RI_{SW}$ quantity changes its logic signal is 4.5 amperes and the current magnitude at which the $I_{SWP}$ quantity changes its logic signal is 6.0 amperes. The current margin used with the foregoing assumptions has upper and lower limits of 6 amperes and 3 amperes, respectively, and a keyer threshold level of −4.5 amperes.

Figure 3:
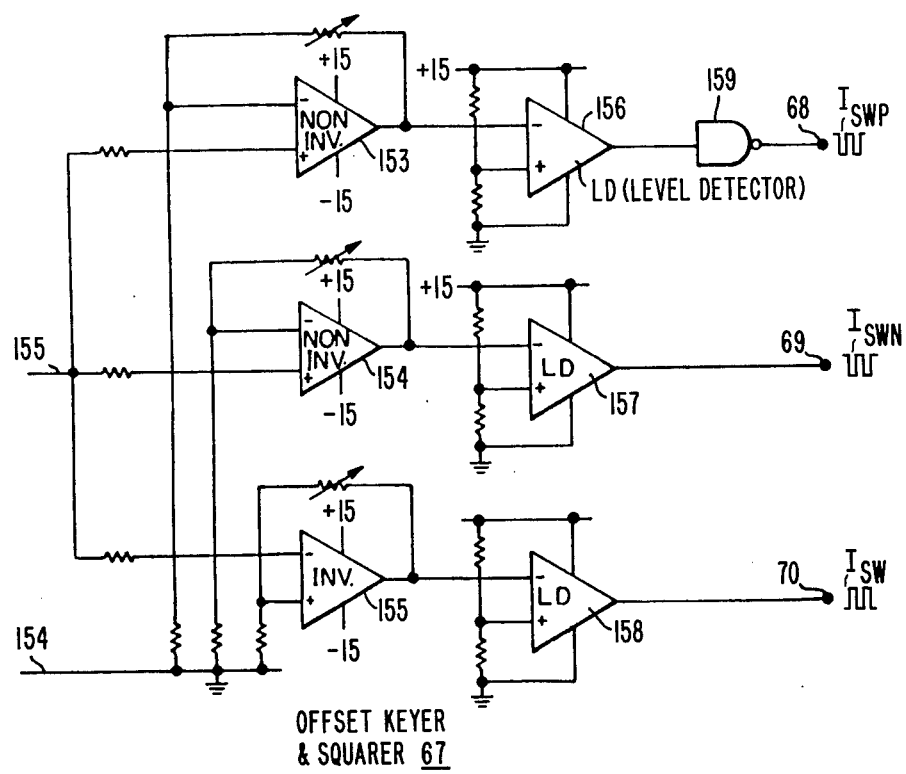
FIG. 3 is a block diagram of the offset keyer and square shown in FIG. 2.

Using these values for the upper and lower limits of the current margin and for the keyer threshold limit, the offset keyer and squarer 67 functions in the following manner. A signal, representative of the current magnitude and polarity flowing in conductor 4, is fed to the offset keyer 67 via busses 62 and 63. As shown in FIG. 3, this signal is then fed to the non-inverting operational amplifiers 153 and 154 and to the inverting operational amplifier 155. Thus, only the signal from amplifier 155 is inverted. Each of the operational amplifiers 153, 154 and 155 is directly coupled to level detectors 156, 157 and 158. The level detectors are adapted so that their output, which is normally a logical 1, goes to a logical 0 whenever the input level to its negative terminal exceeds that applied to its positive input terminal. In the case of level detector 156, the input resistors are chosen so that with the application of the current wave signal from amplifier 153, the output goes to a logical 0 whenever the instantaneous value of the applied current signal exceeds 6 amperes. Since this result, as explained above, is logically opposite to the desired result, inverter 159 is utilized to logically invert the signal which appears on line 68 as $I_{SWP}$. The logic signals for $I_{SWN}$ and $I_{SW}$ are developed in a similar manner, except that there is no need to invert the output of limit detectors 157 and 158 which appear on lines 69 and 70, respectively. It will be understood from the foregoing that adjustments of the threshold levels can be effected by appropriately altering the values of the input resistors of the level detectors 156, 157 and 158.

Figure 8:
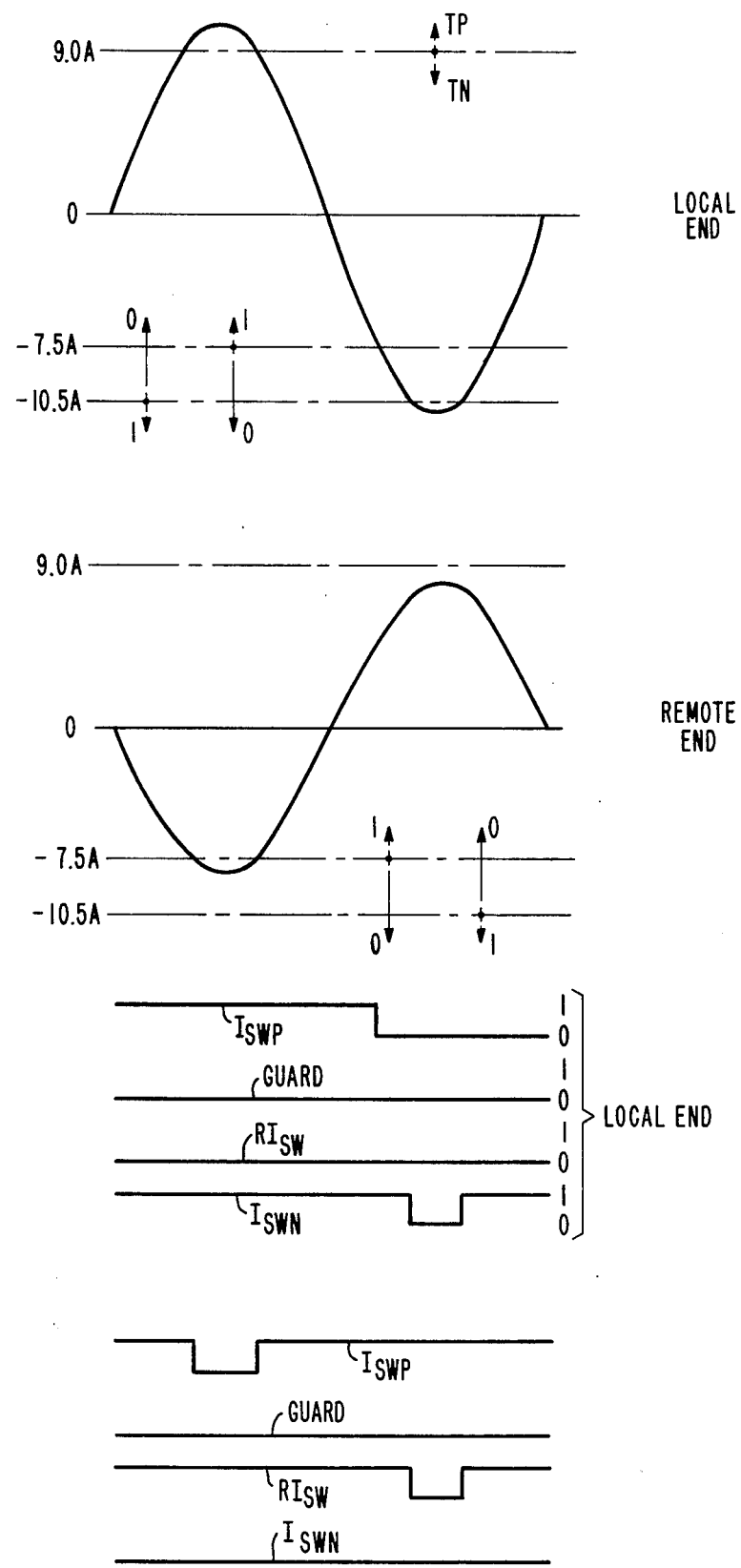
FIG. 8 illustrates the fault current waveforms at the local and remote ends of the protected line section for an internal fault resulting in relatively high outfeed current and the corresponding logic signals generated by the associated prior art relaying apparatus utilized in FIG. 6.

As previously noted, the offset keying solution to the FIG. 4 outfeed current problem, as described above, might lead, in turn, to other problems when the magnitude of the expected outfeed current was relatively high. If, for example, an outfeed current of 7.5 amperes rather than 2.0 amperes is expected, then the keying threshold level, in accordance with the foregoing discussion, would be set at 9.0 amperes. This would result in the threshold levels shown in FIG. 8. With such an arrangement, tripping would occur at the local end of the protected line section during the second half-cycle of the fault current. The remote end of the protected line section would be tripped as a result of steady trip-positive keying at the local end, which action has been previously described.

Figure 9:
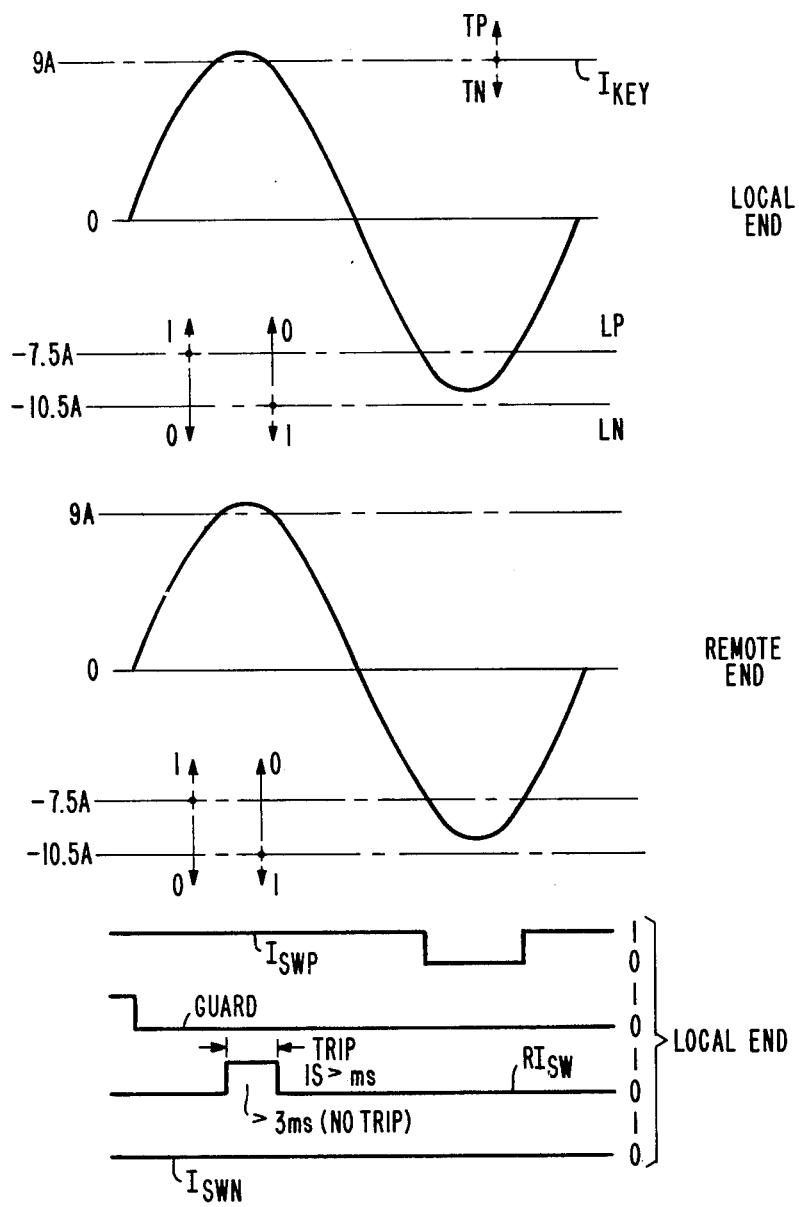
FIG. 9 shows the fault current waveforms at the local and remote ends of the protected line section for an infeed fault condition and the corresponding logic signals generated by the associated prior art relaying apparatus utilized in FIG. 6.

One of the other problems which might now arise is illustrated in FIG. 9 which depicts the fault current waveforms and keying logic signals resulting from an internal fault having secondary infeed current of 8.0 amperes. It would appear at first blush that, in accordance with the truth table, tripping would occur at the local end when $I_{SWP}$ and $RI_{SW}$ both are a logical 1. However, $RI_{SW}$ is a logical one for less than 3 m.s. meaning that the time delay 90 of FIG. 2 will not time out and that the output of trip board 24a will remain at logical 0. For a like reason and due to a lack of steady trip positive keying at the local end, the remote end of the protected line section will not be tripped either.

In accordance with the present invention, this problem is solved in the following manner. The general solution contemplates the employment of different offset keying threshold levels in the offset keyer 67 at each end of the protected line section. One keying threshold level is set to accommodate the situation wherein a relatively high outfeed fault current is expected. The other keying threshold level is set to accommodate the situation wherein infeed fault current lower than the magnitude of the expected relatively high outfeed fault current is possible, that is, the situation described in connection with FIG. 9. While the threshold level for the keyers 67 at both the local and remote ends of the protected line section can be set in accordance with the foregoing without regard to which end will experience the outfeed current condition, it is preferable to have the higher keying threshold level set at that end of the protected line section. As will be explained hereinafter, this allows tripping of the strong end of the protected line section first and at a permissibly higher current level. The foregoing arrangement can be utilized with two or three terminal power line sections and with segregated phase or mixed excitation phase comparison, but will be illustrated and described in the context of segregated phase comparison on a two terminal line.

Figure 10B:
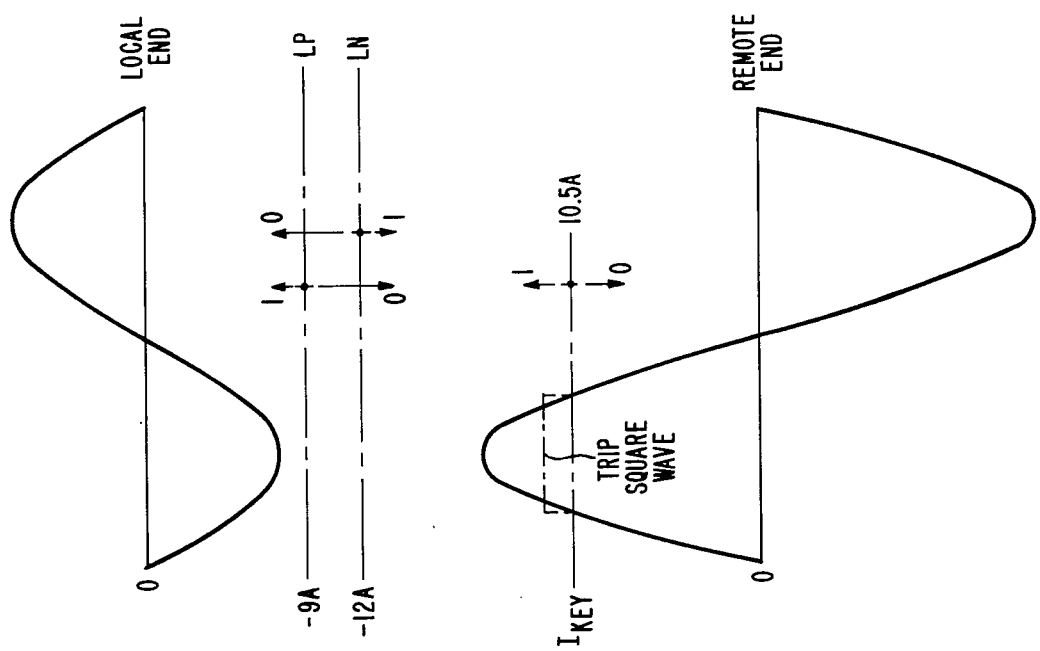
FIGS. 10A and 10B illustrate fault current waveforms at the local and remote ends of the protected line section for an outfeed fault condition wherein the corresponding logic signals have been generated by associated relaying apparatus embodying the present invention.
Figure 10A:
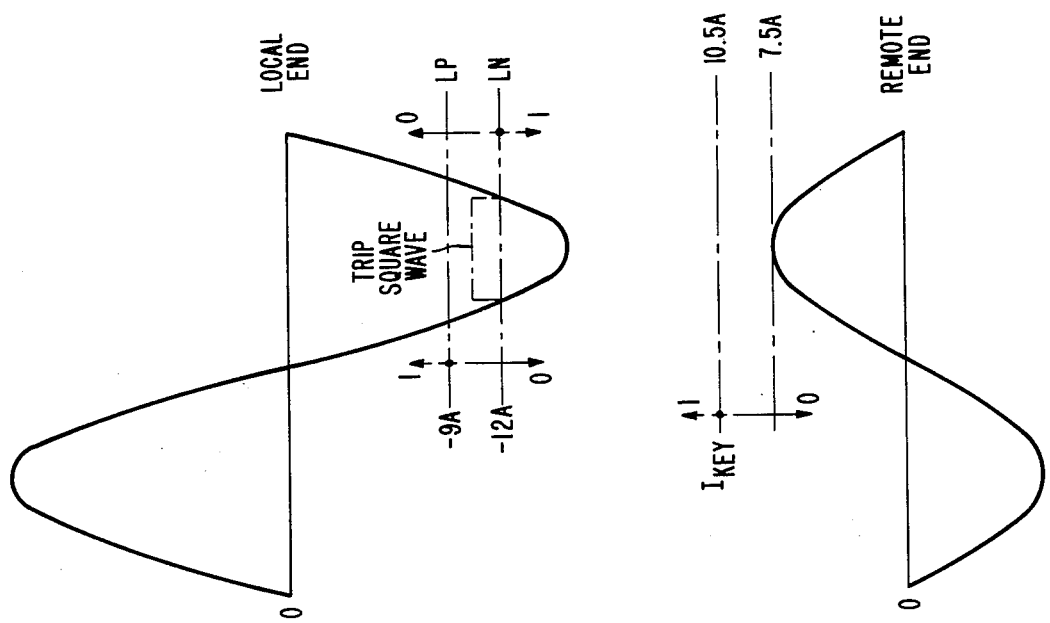

As is shown in FIGS. 10A and 10B, the keying threshold level is set at 10.5 amperes at the remote end of the protected line section. In the illustrated example, an outfeed current maximum of 7.5 amperes is expected. In setting the keying threshold level at 10.5 amperes, the associated local upper current margin threshold level is set at −9.0 amperes, thereby insuring that the $I_{SWP}$ at the local end of the protected line section will be a steady logical 1, for secondary fault currents greater than the upper current margin threshold level. FIG. 10A illustrates how tripping is initiated where the outfeed condition exists at the remote end of the protected line section while FIG. 10B illustrates how tripping is initiated when the outfeed condition exists at the local end of the protected line section.

As is shown in FIG. 10A, the local end of the protected line section is tripped during the second half-cycle of the fault current. Once this occurs, the transmitter-receiver 78, as previously described, begins transmitting a steady trip positive or logical 1 signal. This transmission then causes the remote end of the protected line section to be tripped by the second set of threshold levels as is more fully described in connection with FIG. 11. Similarly, as shown in FIG. 10B, the local end of the protected line section is tripped during the first half-cycle of the fault current and the remote end is tripped by the second set of threshold levels as is more fully described in connection with FIG. 11. Thus, FIGS. 10A and 10B show that the selected threshold levels will permit tripping at the local end of the protected line section for outfeed conditions at either end thereof. FIGS. 10A and 10B also show that the keying threshold level is preferably set high at the end portion of the protected line section which experiences maximum outfeed. As noted above, this allows tripping of the strong terminal first, as is the cause for the arrangement depicted in FIG. 10A. In the FIG. 10B arrangement, however, the weak terminal is tripped first, hence the preference for setting the high keying threshold level at that end of the protected line section whereat outfeed is expected, since by doing so, a higher level of outfeed current can be tolerated.

Figure 11:
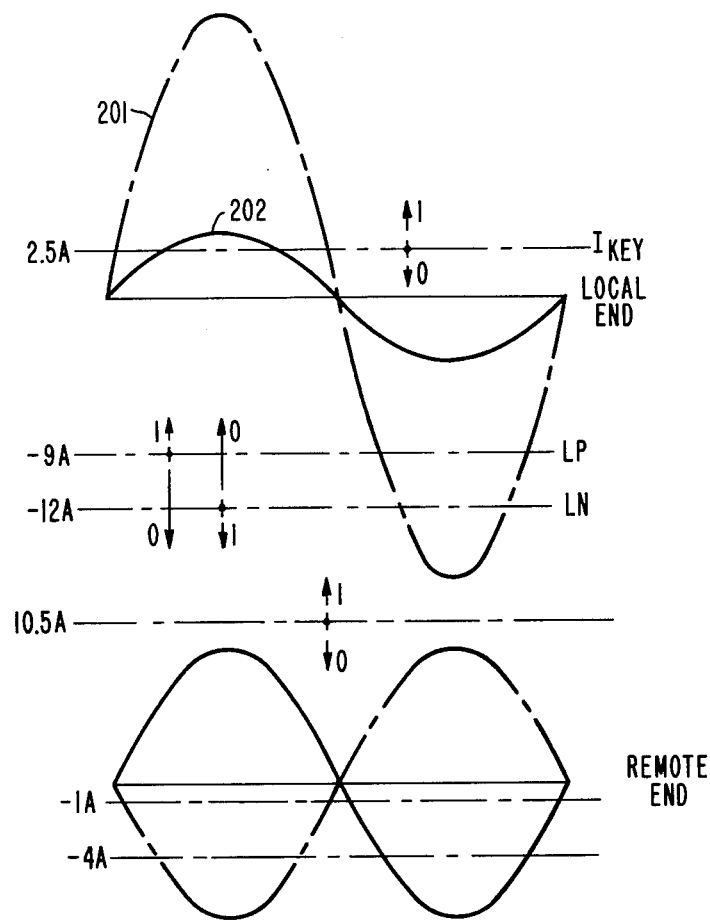
FIG. 11 shows a complete set of current threshold levels intersecting current waveforms at the local and remote ends of the protected line section for both infeed and outfeed fault current and the corresponding logic signals generated by associated relaying apparatus embodying the present invention.

In FIG. 11, a high keying threshold level has been set at the remote end of the protected line section, as was shown in FIG. 10A. In addition, the entire contemplated set of threshold levels has been added to complete the desired arrrangement. Now, the "blind spot" resulting in non-recognition of certain infeed conditions is avoided. Specifically in FIG. 11, the keying threshold level for the local end keyer 67 is set at 2.5 amperes and the upper and lower current margin thresholds of the remote end keyer are set at −1.0 and −4.0 amperes, respectively. Thus, the FIG. 11 arrangement is more than three times as sensitive as the offset keying arrangement of the prior art, that is, 2.5 amperes vs. 8.0 amperes. As before, the assignment of the various threshold levels with respect to the local or remote ends of the protected line section is arbitrary and they can be readily interchanged.

FIG. 11 illustrates the complete set of current threshold levels intersecting the current waveforms 201 and 202 representing both infeed and outfeed fault currents respectively. It can be seen from an inspection thereof, that the relaying apparatus utilizing an offset keyer and squarer 67, adjusted in accordance with the present invention, at each end of the protected line section, will effect tripping for both relatively high outfeed and relatively low infeed fault currents.

It should also be noted that the present arrangement is particularly suitable for use in the apparatus described in the above-referenced Mustaphi applications. In those applications, wherein a delta connected subsystem experiences a phase-to-phase fault for an uncompared delta with maximum load flow and zero feed, the worst foreseeable outfeed situation arises. For this combination of conditions, modified offset keying in accordance with the present invention is particularly appropriate.

We claim:

1. Phase comparison relaying apparatus for protecting an alternating current power transmission line including at least one conductor interconnecting first and second busses, said apparatus comprising:
   a. first circuit means, cooperatively associated with said first bus, adapted to receive a signal representative of the instantaneous magnitude of current flowing in the conductor, for establishing a first set of constant upper and lower limits of a current security margin, both of said first set limits being established to one side of the effective zero axis of the waveform of the signal to be received and for generating
      i. a first output signal when the instantaneous magnitude of the received signal is between said upper and lower limits of said security margin,
      ii. a second output signal when the instantaneous magnitude of the received signal is above said limits of said security margin, and
      iii. a third output signal when the instantaneous magnitude of the received signal is below said limits of said security margin;
   b. second circuit means, cooperatively associated with said first bus, adapted to receive the signal representative of the instantaneous magnitude of current flowing in the conductor, for establishing a first constant keying threshold limit to the other side of the effective zero axis of the waveform of the received signal and for generating
      i. a first output keying signal when the instantaneous magnitude of the received signal is above said first keying threshold limit, and
      ii. a second output keying signal when the instantaneous magnitude of the received signal is below said first keying threshold limit;
   c. third circuit means, cooperatively associated with said second bus, adapted to receive a signal representative of the instantaneous magnitude of current flowing in the conductor, for establishing a second set of constant upper and lower limits of a current security margin, both of said limits being established to one side of the effective zero axis of the waveform of the received signal and for generating
      i. a first output signal when the instantaneous magnitude of the received signal is between said upper and lower limits of said security margin,
      ii. a second output signal when the instantaneous magnitude of the received signal is above said limits of said security margin, and
      iii. a third output signal at the other of its said outputs when the instantaneous magnitude of the received signal is below said limits of said security margin; and
   d. fourth circuit means, adapted to receive the signal representative of the instantaneous magnitude of current flowing in the conductor, for establishing a second constant keying threshold limit to the other side of the effective zero axis of the waveform of the received signal and for generating
      i. a first output keying signal when the instantaneous magnitude of the received signal is above said second keying threshold limit, and
      ii. a second output keying signal when the instantaneous magnitude of the received signal is below said second keying threshold limit; and
   wherein said first and second keying threshold limits are established to be of different magnitudes.

2. The apparatus according to claim 1 wherein the one of said second and fourth circuit means having the higher established magnitude of said keying threshold limits is cooperatively associated with whichever of the first and second busses is expected to experience outfeed fault current.

3. The apparatus according to claim 2 wherein the higher magnitude of said first and second keying threshold limits is offset from the effective zero axis of the received signal by an amount equal to the absolute magnitude of the value of the expected maximum outfeed fault current plus a first operating safety margin.

4. The apparatus according to claim 3 wherein the one of said first and second sets of said upper and lower limits not associated with the bus expected to experience outfeed fault current is adapted with the limit of said set closest to the effective zero axis of the received signal being offset therefrom by an amount equal to the absolute magnitude of the value of the expected maximum outfeed fault current plus a second operating safety margin.

5. The apparatus according to claim 4 wherein said first operating safety margin is greater in absolute magnitude than said second operating safety margin.

6. The apparatus according to claim 5 wherein the magnitudes of said upper limits of said first and second sets of security margins are respectively established as equal to the absolute of said second and first keying threshold limits respectively plus one-half of the absolute magnitude of the difference in magnitude between said limits of said security margins and the magnitudes of said lower limits of said first and second sets of security margins is established as equal to the absolute value of said second and first threshold limits respectively less one-half of the absolute magnitude of the difference in magnitude beween said upper and lower limits of said first and second security margins respectively.

7. The apparatus according to claim 1 wherein the magnitudes of said upper limits of said first and second sets of security margins are respectively established as equal to the absolute of said second and first keying threshold limits respectively plus one-half of the absolute magnitude of the difference in magnitude between said limits of said security margins and the magnitudes of said lower limits of said first and second sets of security margins is established as equal to the absolute value of said second and first threshold limits respectively less one-half of the absolute magnitude of the difference in magnitude between said upper and lower limits of said first and second security margins respectively.

8. The apparatus according to claim 2 wherein the magnitudes of said upper limits of said first and second sets of security margins are respectively established as equal to the absolute of said second and first keying threshold limits respectively plus one-half of the absolute magnitude of the difference in magnitude between said limits of said security margins and the magnitudes of said lower limits of said first and second sets of security margins is established as equal to the absolute value of said second and first threshold limits respectively less one-half of the absolute magnitude of the difference in magnitude between said upper and lower limits of said first and second security margins respectively.

* * * * *